United States Patent
Carberry et al.

(10) Patent No.: US 9,533,359 B2
(45) Date of Patent: Jan. 3, 2017

(54) DRILLING APPARATUS AND METHOD

(71) Applicant: BAE Systems PLC, London (GB)

(72) Inventors: Jonathan Michael Carberry, Lancashire (GB); Austin James Cook, Lancashire (GB)

(73) Assignee: BAE Systems plc, London (GB)

( * ) Notice: Subject to any disclaimer, the term of this patent is extended or adjusted under 35 U.S.C. 154(b) by 287 days.

(21) Appl. No.: 14/375,979

(22) PCT Filed: Jan. 29, 2013

(86) PCT No.: PCT/GB2013/050185
§ 371 (c)(1),
(2) Date: Jul. 31, 2014

(87) PCT Pub. No.: WO2013/114090
PCT Pub. Date: Aug. 8, 2013

(65) Prior Publication Data
US 2015/0023748 A1    Jan. 22, 2015

(30) Foreign Application Priority Data
Feb. 1, 2012   (GB) .................................. 1201745.5

(51) Int. Cl.
*B23B 35/00*   (2006.01)
*B23B 39/14*   (2006.01)
(Continued)

(52) U.S. Cl.
CPC ............... *B23B 39/14* (2013.01); *B23B 35/00* (2013.01); *B23B 49/00* (2013.01); *B25J 9/16* (2013.01);
(Continued)

(58) Field of Classification Search
CPC .......... B23B 39/14; B23B 35/00; B23B 49/00; B23B 2215/04; B23B 2220/04; Y10T 408/03; Y10T 408/08; Y10T 408/175; Y10T 408/21; Y10T 408/561
See application file for complete search history.

(56) References Cited

U.S. PATENT DOCUMENTS

| 5,231,747 A | 8/1993 | Clark et al. |
| 6,108,896 A | 8/2000 | Gignac et al. |
| 2002/0104207 A1 | 8/2002 | Smith et al. |

FOREIGN PATENT DOCUMENTS

| DE | 20 2008 014 886 U1 | 5/2010 |
| EP | 0 338 117 A2 | 10/1989 |

(Continued)

OTHER PUBLICATIONS

PCT Search Report dated May 24, 2013 of Patent Application No. PCT/GB2013/050185 filed Jan. 29, 2013, 4 pages.

(Continued)

*Primary Examiner* — Sunil K Singh
*Assistant Examiner* — Alan Snyder
(74) *Attorney, Agent, or Firm* — Maine Cernota & Rardin

(57) ABSTRACT

Drilling apparatus and method, the apparatus comprising: a first robot (10); a first member (30) (e.g. a pressure foot) and a drilling tool (38) both coupled to the first robot (10); a second robot (12); and a second member (52) coupled to the second robot (12); wherein the apparatus is arranged to press the members (30, 52) against opposite sides of a part to be drilled (2, 100) (e.g. an aircraft panel) so as to hold the part (2, 100) and prevent deflection of at least a portion of the part (2, 100); and the first member (30) and the drilling tool (38) are arranged such that the drilling tool (38) may drill into the portion of the part (2, 100) of which deflection is opposed from the side of the part (2, 100) pressed against by the first member (30). The robots (10, 12) may be robotic arms.

15 Claims, 8 Drawing Sheets

(51) Int. Cl.
  *B25J 9/16* (2006.01)
  *B23B 49/00* (2006.01)
  *G05B 19/4069* (2006.01)
  *G05B 19/4099* (2006.01)

(52) U.S. Cl.
  CPC .......... *B25J 9/1682* (2013.01); *G05B 19/4069* (2013.01); *G05B 19/4099* (2013.01); *B23B 2215/04* (2013.01); *B23B 2220/04* (2013.01); *G05B 2219/39109* (2013.01); *G05B 2219/39116* (2013.01); *G05B 2219/39121* (2013.01); *G05B 2219/39129* (2013.01); *G05B 2219/45059* (2013.01); *G05B 2219/49113* (2013.01); *Y10S 901/09* (2013.01); *Y10S 901/41* (2013.01); *Y10S 901/47* (2013.01); *Y10T 408/03* (2015.01); *Y10T 408/08* (2015.01); *Y10T 408/175* (2015.01); *Y10T 408/21* (2015.01); *Y10T 408/561* (2015.01)

(56) References Cited

FOREIGN PATENT DOCUMENTS

| | | |
|---|---|---|
| EP | 1884313 A2 | 2/2008 |
| EP | 2 116 340 A1 | 11/2009 |
| EP | 2809485 A1 | 12/2014 |
| EP | 2927765 A1 | 10/2015 |
| GB | 2 246 732 A | 2/1992 |

OTHER PUBLICATIONS

UK Search Report dated May 31, 2012 of Patent Application No. GB1201745.5 filed Feb. 1, 2012, 2 pages.

GB Combined Search and Examination Report for Application No. GB 1508546.7 dated Jun. 29, 2015, 7 pages.

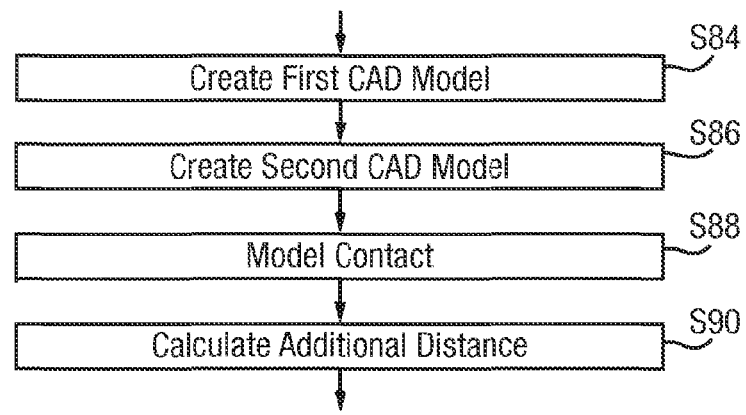
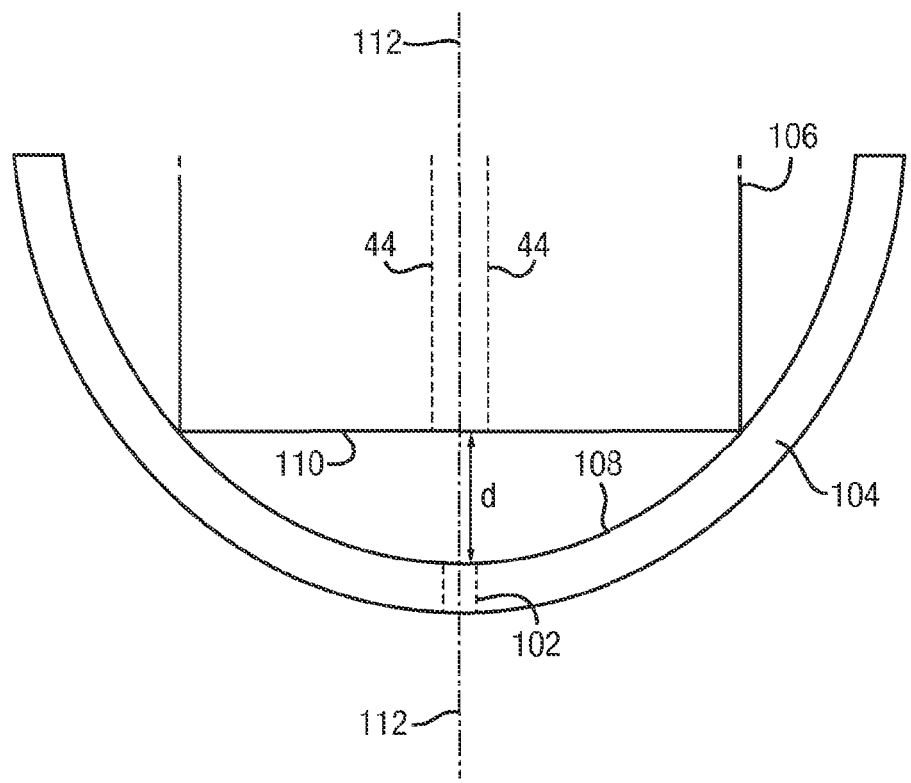

DRILLING APPARATUS AND METHOD

RELATED APPLICATIONS

This application is a national phase application filed under 35 USC §371 of PCT Application No. PCT/GB2013/050185 with an International filing date of Jan. 29, 2013 which claims priority to GB1201745.5, filed Feb. 1, 2012. Each of these applications is herein incorporated by reference in their entirety for all purposes.

FIELD OF THE INVENTION

The present invention relates to drilling methods and apparatus.

BACKGROUND

In the field of aircraft construction, it tends to be desirable to countersink predrilled holes in panels that are to be fastened to a structure to provide an airframe. This is performed so that the fastener used to fasten the panel to the structure may be flush with a surface of the panel (e.g. the outer surface of the aircraft). This tends to provide that the resulting airframe has better aerodynamic properties compared to if the fastener was not flush with the outer surface of the aircraft.

Countersinking of predrilled holes may be performed manually by human operators, e.g. using hand tools and workbenches. During the countersinking process, the panels may bend or deflect on the workbench due to the forces applied by the operator. The operator may manually compensate for such deflection. The operator may also compensate for curvature in the part being countersunk e.g. by manually adjusting the settings on the hand tool. However, large workforces and workspaces tend to be required for processing a large number of panels. Also, the human operators may develop repetitive strain injury caused by repeated drilling.

Countersinking of holes may also be performed using a machine tool (or robot). The use of such devices typically requires use of a secure fixture that rigidly supports a panel so as to prevent it deflecting under the cutting/drilling forces. Such machine tools can be very expensive. The fixtures, which are usually required to be bespoke for the shape of panel being drilled, also tend to be expensive.

SUMMARY OF THE INVENTION

In a first aspect, the present invention provides drilling apparatus comprising, a first robot, a first member coupled to the first robot, a drilling tool coupled to the first robot, a second robot, and a second member coupled to the second robot, wherein the apparatus is arranged to press the members against opposite sides of a part to be drilled so as to hold the part and prevent deflection of at least a portion of the part, and the first member and the drilling tool are arranged such that the drilling tool may drill into the portion of the part of which deflection is opposed, the drilling being from the side of the part pressed against by the first member.

The first member and the drilling tool may be arranged such that the drilling tool may countersink, to a predetermined depth, a predrilled hole, the predrilled hole being through the part from one side of the part to the opposite side.

The apparatus may further comprise a lighting system configured to shine light through the predrilled hole, a light detection system configured to measure light after it has been shone through the predrilled hole, and an alignment processor operatively coupled to the light detection system. The alignment processor may be configured to, using measurements of light shone through the predrilled hole, determine a first action for performance by at least part of the apparatus. The first action may be such that, if it were to be performed by the at least part of the apparatus, the drilling tool would be aligned with the predrilled hole. The apparatus may be arranged to perform the first action.

The lighting system may be coupled to the second robot. The light detection system may be coupled to the first robot. The light detection system may be coupled to the drilling tool. The determination of the first action may comprise using known relative positions of the drilling tool and the light detection system.

The apparatus may further comprise a surface measurement system configured to measure a surface of the part at a plurality of points, and a normalisation processor operatively coupled to surface measurement system. The normalisation processor may be configured to, using the measurements of the first surface, determine a second action for performance by at least part of the apparatus. The second action may be such that, if it were to be performed by the at least part of the apparatus, the drilling tool would be positioned at a predetermined angle relative to the surface of the part. The apparatus may be arranged to perform the second action.

The plurality of points on the surface of the part may be proximate to a point on the surface that is to be drilled using the drilling tool.

The first member may be moveable with respect to the cutting tool. The pressing of the first member against a side of the part may comprise moving the first member by a certain distance with respect to the drilling tool. The apparatus may further comprise a sensor configured to measure the certain distance moved by the first member with respect to the drilling tool, and a processor operatively coupled to the sensor and configured to determine, using the sensor measurement, a distance to be moved by the drilling tool in order to drill into the part to a predetermined depth.

The apparatus may further comprise a swarf extraction system.

The first robot may be a robotic arm.

The second robot may be a robotic arm.

In a further aspect, the present invention provides a drilling method comprising, providing a first robot, providing a first member coupled to the first robot, providing a drilling tool coupled to the first robot, providing a second robot, providing a second member coupled to the second robot, pressing the members against opposite sides of a part to be drilled so as to hold the part and prevent deflection of at least a portion of the part, and drilling, with the drilling tool, into the portion of the part of which deflection is opposed, the drilling being from the side of the part pressed against by the first member.

The step of drilling may comprise countersinking, to a predetermined depth, a predrilled hole, the predrilled hole being through the part from one side of the part to the opposite side.

The method may further comprise shining light through the predrilled hole, measuring the light after it has been shone through the predrilled hole, using the measurements of the light, determining a first action for performance by at least part of the apparatus, and performing, by the at least part of the apparatus, the first action. The first action may be such that, if it were to be performed by the at least part of the apparatus, the drilling tool would be aligned with the predrilled hole.

The light may be shone by a lighting system coupled to the second robot. The light may be detected by a light detection system coupled to the first robot. The light detection system may be coupled to the drilling tool. The determination of the first action may comprise using known relative positions of the drilling tool and the light detection system.

The method may further comprise measuring a surface of the part at a plurality of points, using the measurements of the surface, determining a second action for performance by at least part of the apparatus, and performing, by the at least part of the apparatus, the second action. The second action may be such that, if it were to be performed by the at least part of the apparatus, the drilling tool would be positioned at a predetermined angle relative to the surface of the part.

The plurality of points on the surface of the part may be proximate to a point on the surface that is to be drilled using the drilling tool.

The first member may be moveable with respect to the cutting tool. The pressing the first member against a side of the part may comprise moving the first member by a certain distance with respect to the drilling tool. The method may further comprise measuring the certain distance moved by the first member with respect to the drilling tool, and, using the sensor measurement, determining a distance to be moved by the drilling tool in order to drill into the part to a predetermined depth.

The method may further comprise extracting swarf during the step of drilling.

The first robot may be a robotic arm.

The second robot may be a robotic arm.

In a further aspect, the present invention provides a robotic arm end effector comprising a member for pressing, at its front side, against at least a portion of a surface of a part to be drilled, and a drilling tool, wherein the member comprises a passage through its structure from a rear side of the member to a front side of the member, the drilling tool is moveable with respect to the member such that at least a portion of the drilling tool may be moved through the passage from the rear side of the member to the front side of the member.

The drilling tool may be moveable with respect to the member such that a longitudinal axis of the drilling tool may be aligned with an axis of the passage.

The end effector may further comprise a light detection system configured to measure light passing through the passage from the front side of the member to the rear side of the member.

The light detection system may be moveable with respect to the member such that the light detection system may be aligned with an axis of the passage.

The end effector further may comprise a rotatable portion, wherein the drilling tool is mounted on to the rotatable portion, the light detection system is mounted on to the rotatable portion, the rotatable portion is rotatable between a first position and a second position, the first position is such that a longitudinal axis of the drilling tool is aligned with an axis of the passage, and such that the light detection system is not aligned with the axis of the passage, and the second position is such that the longitudinal axis of the drilling tool is not aligned with the axis of the passage, and such that the light detection system is aligned with the axis of the passage.

The end effector may further comprise a frame and a sensor, wherein the member is moveable with respect to the frame for coupled to the robotic arm, and the sensor is configured to measure a distance moved by the member with respect to the frame.

In a further aspect, the present invention provides a robotic arm end effector comprising: a member for pressing, at its front side, against at least a portion of a surface of a part, the part being a part to be drilled, and a lighting system, wherein the member comprises a passage through its structure from a rear side of the member to a front side of the member, and the lighting system is arranged to shine light through the passage from the rear side of the member to a front side of the member.

The member may tapers towards its front side.

The member may have a shape of a frustum of a cone, and the passage may be along an axis of the frustum of the cone.

In a further axis, the present invention provides a method for modelling at least a portion of a drilling apparatus and at least a portion of a part to be drilled by the drilling apparatus, the drilling apparatus comprising a member and a drilling tool, the member is for pressing against at least a portion of a surface of the part, the method comprising: providing a first computer model, the first computer model comprising a model of at least part of the surface of the part, providing a second computer model, the second computer model comprising a model of at least part of the member, positioning the first and second computer models such that the relative positions of the first and second computer models are substantially the same as the relative positions of the surface and the member if the drilling tool had been aligned with a point on the surface that is to be drilled by the drilling tool, and the member had been pressed against the at least a portion of the surface, and using the computer models, determining a distance for the drilling tool to be moved in order to drill the surface of the part.

In a further aspect the present invention provides a drilling method, the method comprising: performing the method according to the previous aspect, aligning the drilling tool with the point on the surface that is to be drilled by the drilling tool, pressing the member against the at least a portion of the surface of the part, and, when the drilling tool is aligned with the point on the surface that is to be drilled by the drilling tool and the member is pressed against the part, drilling into the surface of the part, wherein the step of drilling comprises moving the drilling tool by the determined distance.

The method may further comprise pressing a further member against an opposite side of the part to the side of the part pressed against by the member so as to hold the part and prevent deflection of at least a portion of the part, wherein the step of drilling is performed when the part is pressed against by the member and the further member, and the step of drilling is performed so as to drill the surface of the at least a portion of the part of which deflection is opposed.

The step of drilling may be performed so as to countersink, to a predetermined depth, a predrilled hole, the predrilled hole being through the part from one side of the part to the opposite side.

The method may further comprise shining light through the predrilled hole, measuring the light after it has been shone through the predrilled hole, using the measurements of the light, determining a first action for performance by at least part of the apparatus, and performing, by the at least part of the apparatus, the first action, wherein the first action is such that, if it were to be performed by the at least part of the apparatus, the drilling tool would be aligned with the predrilled hole.

The light may be shone by a lighting system coupled to the second robot. The light may be detected by a light detection system coupled to the first robot. The light detection system may be coupled to the drilling tool. The determination of the first action may comprise using known relative positions of the drilling tool and the light detection system.

The method may further comprise measuring a surface of the part at a plurality of points, using the measurements of the surface, determining a second action for performance by at least part of the apparatus, and, performing, by the at least part of the apparatus, the second action, wherein the second action is such that, if it were to be performed by the at least part of the apparatus, the drilling tool would be positioned at a predetermined angle relative to the surface of the part.

The plurality of points on the surface of the part may be proximate to a point on the surface that is to be drilled using the drilling tool.

The first member may be moveable with respect to the cutting tool. The pressing of the first member against a side of the part may comprise moving the first member by a certain distance with respect to the drilling tool. The method may further comprise measuring the certain distance moved by the first member with respect to the drilling tool, and the step of determining a distance for the drilling tool to be moved in order to drill the surface of the part may comprise using the sensor measurement.

The method may further comprise extracting swarf during the step of drilling.

The member may be coupled to a first robotic arm. The further member may be coupled to a second robotic arm.

In a further aspect, the present invention provides apparatus for modelling at least a portion of a drilling apparatus and at least a portion of a part to be drilled by the drilling apparatus, the drilling apparatus comprising a member and a drilling tool, the member is for pressing against at least a portion of a surface of the part, the apparatus comprising one or more processors arranged to provide a first computer model, the first computer model comprising a model of at least part of the surface of the part, provide a second computer model, the second computer model comprising a model of at least part of the member, position the first and second computer models such that the relative positions of the first and second computer models are substantially the same as the relative positions of the surface and the member if the drilling tool had been aligned with a point on the surface that is to be drilled by the drilling tool, and the member had been pressed against the at least a portion of the surface, and using the computer models, determine a distance for the drilling tool to be moved in order to drill the surface of the part.

In a further aspect, the present invention provides a computer program or plurality of computer programs arranged such that when executed by a computer system it/they cause the computer system to operate in accordance with any of the above aspects.

In a further aspect, the present invention provides a machine readable storage medium storing a computer program or at least one of the plurality of computer programs according to the previous aspect.

BRIEF DESCRIPTION OF THE DRAWINGS

FIG. 11 is a process flow chart showing certain steps of a process of for determining an additional distance; and FIG. 12 is a schematic illustration (not to scale) showing first and second Computer Aided Design (CAD) models.

DETAILED DESCRIPTION

Figure 1:
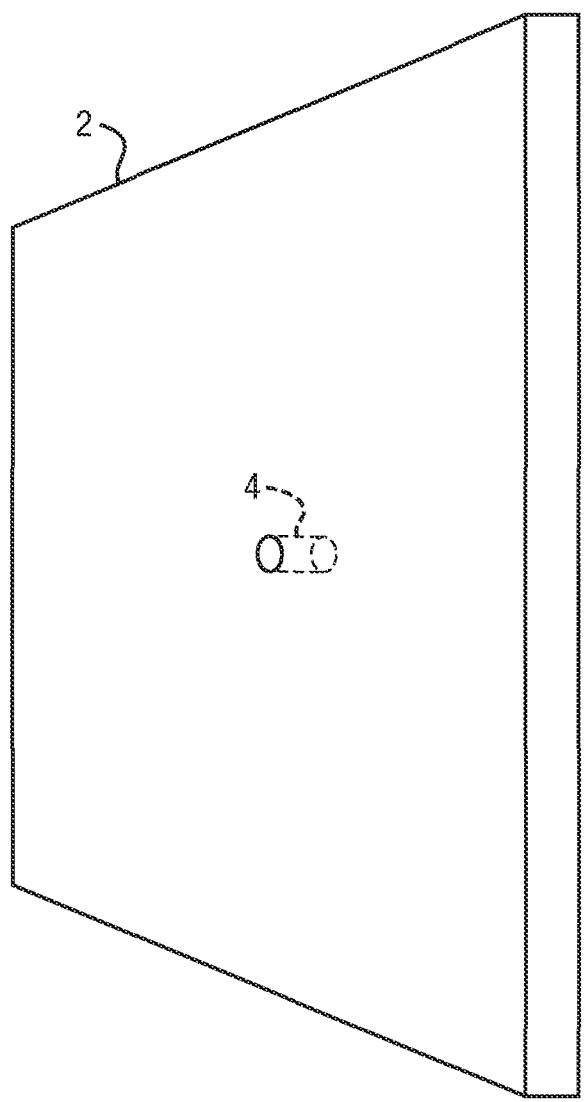
FIG. 1 is a schematic illustration (not to scale) of an example panel.

FIG. 1 is a schematic illustration (not to scale) of an example panel 2.

The panel 2 is made of carbon fibre. The panel 2 comprises a pre-drilled hole 4 through the panel 2 from a front surface of the panel 2 to a rear surface of the panel 2. In other words, the hole 4 is a passage through the structure of the panel 4.

The hole 4 is of known diameter. The direction of the hole 4 through the panel 2 is normal (i.e. perpendicular) to the front surface of the panel 2.

In this embodiment, the panel 2 is to be fixed to a structure to form part of an airframe of an aircraft. The panel is to be fixed to the structure by a fastener that passes through the hole 4 (from the front surface to the rear surface) and into the structure. The hole 4 is to be countersunk (to a predetermined depth) at the front surface so that the fastener is flush with the front surface. This tends to provide that the resulting aircraft is relatively aerodynamic and stealthy.

Figure 2:
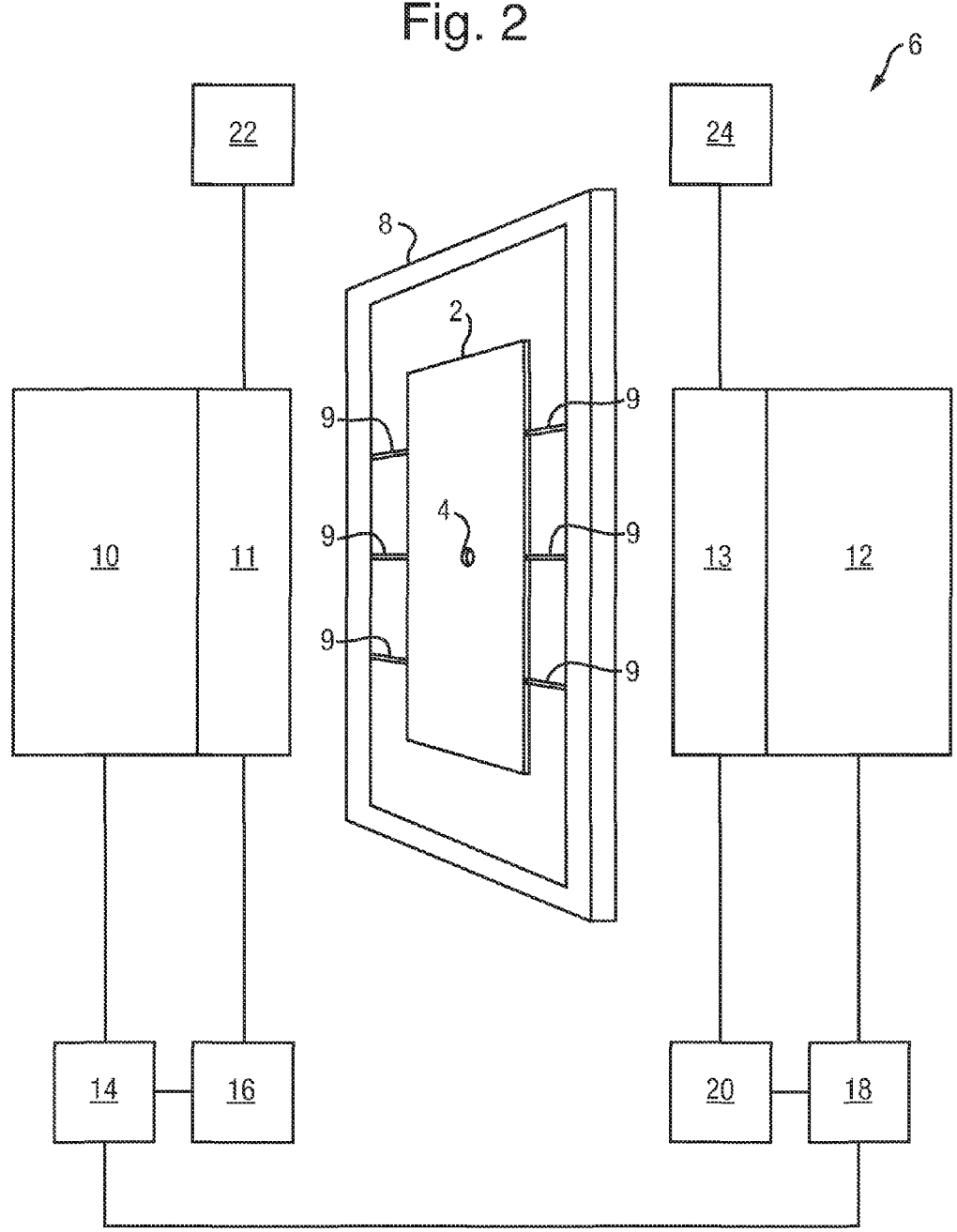
FIG. 2 is a schematic illustration (not to scale) of apparatus for performing a countersinking process.

FIG. 2 is a schematic illustration (not to scale) of apparatus 6 for performing a countersinking process. The countersinking process is to countersink (to the pre-determined depth) the hole 4 at the front surface of the panel 2.

A countersinking process is an example of a drilling process. The terminology "drilling process" is used herein to refer to any type of drilling process including, but not limited to, drilling a hole, countersinking (a pre-drilled hole), reaming, orbital drilling, etc.

The apparatus 6 comprises a fixture system 8, a plurality of clamps 9, a first robot 10, a first end effector 11, a second robot 12, a second end effector 13, a first robot controller 14, a first end effector controller 16, a second robot controller 18, a second end effector controller 20, a first swarf extraction module 22, and a second swarf extraction module 24.

The fixture system 8 is a frame in which the panel 2 is clamped using the plurality of clamps 9. In this embodiment, the fixture system 8 is a conventional fixture system such as the BoxJoint fixture system supplied by DELFOi which typically comprises a jig, the framework of which is made by joining standard galvanised steel beams. The clamps 9 are conventional clamps.

The first robot 10 is a conventional industrial robot arm, or robotic arm, for use in a countersinking process. For example, the first robot arm 10 is a KR360 robot arm manufactured by Kuka Gmbh.

The first end effector 11 is coupled to an end of the first robot arm 10 such that the first robot 10 may move the first end effector 11. The first robot 10 and the first end effector 11 are positioned at a front side of the fixture system 8, i.e. in front of the front surface of the panel 2 so that the front surface of the panel 2 is accessible by the first robot 10 and the first end effector 11.

The first robot 10 and the first end effector 11 can be conveniently thought of as a single module, e.g. a first module, a drilling module, or a drilling apparatus.

The first end effector 11 will be described in more detail later below with reference to FIG. 3.

The second robot 12 is a conventional industrial robot arm, or robotic arm, for use in a countersinking process. For example, the second robot 12 is a KR180 robot arm manufactured by Kuka Gmbh.

The second end effector 13 is coupled to an end of the second robot arm 12 such that the second robot 12 may move the second end effector 13.

The second robot 12 and the second end effector 13 are positioned at a rear side of the fixture system 8, i.e. behind the rear surface of the panel 2 so that the rear surface of the panel is accessible by the second robot 12 and the second end effector 13.

The second robot 12 and the second end effector 13 can be conveniently thought of as a single module, e.g. a second module, a supporting module, or a supporting apparatus.

The second end effector 13 will be described in more detail later below with reference to FIG. 4.

The first robot 10 is coupled to the first robot controller 14 in such a way that the first robot 10 is controlled by the first robot controller 14.

The first end effector 11 is coupled to the first end effector controller 16 in such a way that the first end effector 11 is controlled by the first end effector controller 16.

The first robot controller 14 and the first end effector controller 16 are coupled together such that they may communicate.

The second robot 12 is coupled to the second robot controller 18 in such a way that the second robot 12 is controlled by the second robot controller 18.

The second end effector 13 is coupled to the second end effector controller 20 in such a way that the second end effector 13 is controlled by the second end effector controller 20.

The second robot controller 18 and the second end effector controller 20 are coupled together such that they may communicate.

The first robot controller 14 and the second robot controller 18 are conventional controlling units for controlling the first robot 10 and second robot 12 respectively.

The first robot controller 14 and the second robot controller 18 are coupled together such that they may communicate. In particular, in this embodiment, the first and second robot controllers 14, 18 are coupled together such that, in a first mode of operation, the first and second robots 10, 12 have a "master-slave relationship", i.e. such that if the first robot 10 is moved then the second robot 12 is also moved such that the relative position between the first and second robots 10, 12 is substantially maintained. Also, in this embodiment, the first and second robot controllers 14, 18 are coupled together such that, in a second mode of operation, the first and second robots 10, 12 may be moved independently from one another.

Instructions for moving the first and second robots 10, 12 reside in the first and second robot controllers 14, 18 respectively, e.g. either as an off-line program (OLP) or a sub-routine called by the off-line program.

The first swarf extraction system 22 is a conventional swarf extraction system. The first swarf extraction system 22 is coupled to the first end effector 11 and is configured to extract swarf (i.e. debris or waste, e.g. turnings, chippings, filings, or shavings) that results from the below described countersinking process.

The second swarf extraction system 24 is a conventional swarf extraction system. The second swarf extraction system 24 is coupled to the second end effector 13 and is configured to extract swarf (i.e. debris or waste, e.g. turnings, chippings, filings, or shavings) that results from the below described countersinking process.

Figure 3:
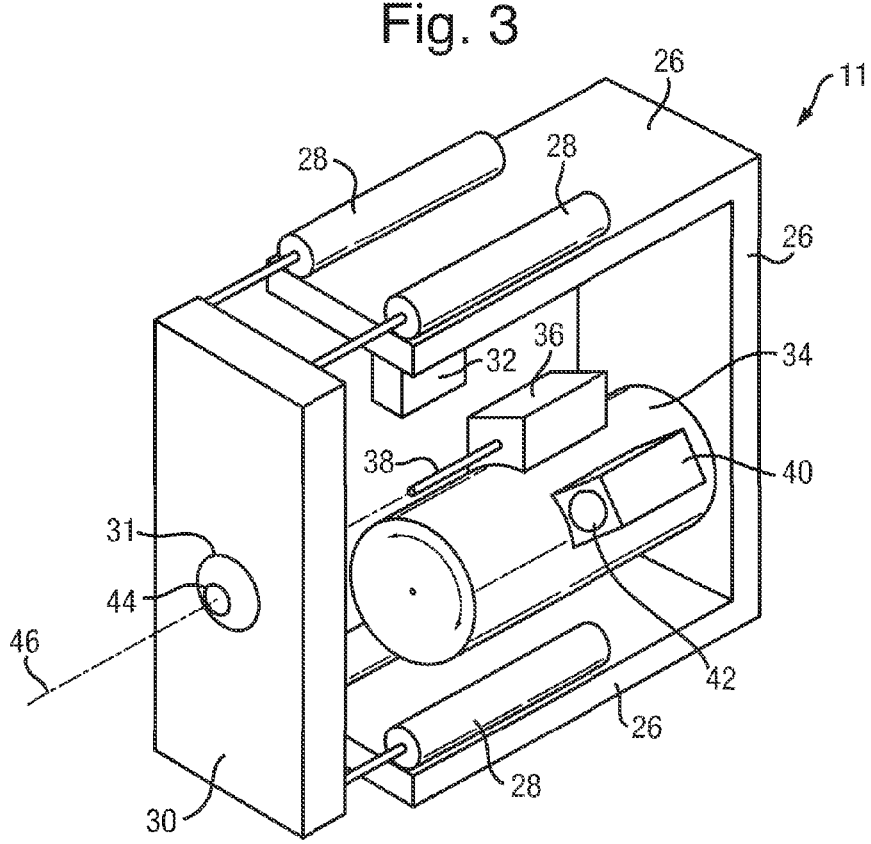
FIG. 3 is a schematic illustration (not to scale) of a first end effector.

FIG. 3 is a schematic illustration (not to scale) of the first end effector 11.

In this embodiment, the first end effector 11 comprises a first frame 26, a plurality of air cylinders 28, a pressure foot 30 (which comprises a normalisation system 31), a sensor 32, a rotatable leg 34, a drilling system 36 (which comprises a cutting tool 38 (i.e. a drilling tool)), and a vision system 40 (which comprises a camera 42).

The first frame 26 of the first end effector 11 is attached to the first robot 10.

The rotatable leg 34 is attached to the first frame 26 such that it may rotate relative to the first frame 26, and such that it is not moveable in a longitudinal direction relative to the first frame 26.

The air cylinders 28 are attached between the end first frame 26 and the pressure foot 30 such that, under action of the air cylinders 28, the pressure foot 30 may be moved with respect to the first frame 26 (i.e. the pressure foot 30 may be extended from the first frame 26).

The rotatable leg 34 may rotate around (and be supported by) an elongate member that is positioned along the axis of the rotatable leg 34. This elongate member may, for example, be attached at both of its ends to the frame 26. In other embodiments, the elongate member may be an air cylinder 28 which is attached at one of its ends to the frame 26, and the other of its ends to the pressure foot 30. Such an additional air cylinder may provide the same functionality as the other air cylinders 28.

The pressure foot 30 is a conventional pressure foot used by conventional robotic systems. The pressure foot 30 may, under action of the air cylinders 28, be extended from the first frame 26 until a front surface of the pressure foot 30 contacts (i.e. presses against) the front surface of the panel 2, at which point movement of the pressure foot 30 with respect to the first frame 26 is stopped.

The sensor 32 is attached to the first frame 26. The sensor is configured to measure a distance moved by the pressure foot 30 with respect to the first frame 26 (i.e. a distance from the first frame 26 that the pressure foot 30 is extended). In this embodiment, the sensor 32 is a laser triangulation displacement sensor. In other embodiments, a different type of sensor, e.g. a linear variable differential transformer (LVDT), and/or a different sensor configuration, may be used to measure the position of the pressure foot 30 with respect to the first frame 26. Measurements made by the sensor 32 are sent from the first end effector 11 to the first end effector controller 16 as described in more detail later below with reference to FIG. 5.

The pressure foot 30 comprises a passage 44 (i.e. an aperture or hole) through its structure. In this embodiment, the normalisation system 31 is attached to the front surface of the pressure foot 30 such that it surrounds the passage 44.

The normalisation system 31 comprises five contact measurement devices. Each contact measurement device is an extendible member, which is configured to, in operation, extend from the front surface of the pressure foot 30 until it contacts the front surface of the panel 2, at which point the extendible member stops extending. This stopping of the extension of the extendible members may be as a result of the resistive force applied to the extendible member, by the panel 2, when the extendible member contacts the front surface of the panel 2. In other words, the front surface of the panel 2 may prevent further extension of the extendible members. Measurements of the distances moved by each of the extendible members of the normalisation system 31 are sent from the first end effector 11 to the first end effector controller 16 as described in more detail later below with reference to FIG. 5.

The rotatable leg 34 is coupled to the first frame 26 such that the rotatable leg 34 may rotate about its axis. This rotation is indicated in FIG. 3 by a double-headed arrow.

The drilling system 36 comprises a rotatable liquid cooled spindle which, in operation, drives (i.e. rotates) the cutting tool 38.

The drilling system 36 is slideably mounted to the rotatable leg 34 such that the drilling system 36 may be moved along the surface of the rotatable leg 34 in a direction parallel to the axis of the rotatable leg 34, and such that movement of the drilling system 36 in a direction around the circumference of the rotatable leg 34 is prevented. In this way, the cutting tool 38 is moved along its (longitudinal) axis (which is shown in FIG. 3 as a dotted line indicated by the reference numeral 46).

In this embodiment, the drilling system 36 may be positioned (by rotating the rotatable leg 34 about its axis) such that the axis 46 of the cutting tool 38 passes through the passage 44 in the pressure foot 30. When in this position, i.e. when the axis 46 of the cutting tool 38 is aligned with the passage 44, (as shown in FIG. 3), the drilling system 36 may be slid along the surface of the rotatable leg 34 (in a direction parallel to the axis of the rotatable leg 34) such that at least a portion of the cutting tool 38 passes completely through the passage 44. In operation, as described below, to countersink the hole 4, the cutting tool 38 is moved along its (longitudinal) axis 46, through the passage 44, and towards the panel 2 until it contacts the front surface of the panel 2 at the hole 4. The cutting tool 38 is then moved further to countersink the hole 4 of the panel 2 to the pre-determined depth.

The vision system 40 is a conventional vision system. The vision system 40 comprises the camera 42 which is a conventional industrial CCD camera with a telecentric lens.

The vision system 40 is slideably mounted to the rotatable leg 34 such that the vision system 40 may be moved along the surface of the rotatable leg 34 in a direction parallel to the axis of the rotatable leg 34, and such that movement of the vision system 40 in a direction around the circumference of the rotatable leg 34 is prevented. In this way, the vision system 40 may be moved in a direction that is substantially parallel to the axis 46. The vision system 40 and the drilling system 36 are mounted on the rotatable leg 34 such that the relative position between the vision system 40 and the drilling system 36 is maintained.

In this embodiment, the vision system 40 may be positioned (by rotating the rotatable leg 34 about its axis) such that the camera 42 of the vision system 40 is able to detect light passing through the passage 44 (from the front of the pressure foot 30 to its rear). When in this position, i.e. when the camera 42 of the vision system 40 is aligned with the passage 44, if the rotatable leg 34 is then rotated, the drill system 36 would be brought into alignment with the passage 44 (i.e. the axis 46 of the cutting tool 38 would be moved so that it passes through the passage 44).

In this embodiment, the movement of the pressure foot 30 by the air cylinders 28 is controlled by the first end effector controller 16. Also, the rotation of the rotatable leg 34 about its axis is controlled by the first end effector controller 16. Also, the movement along the surface of the rotatable leg 34 of the drilling system 36 is controlled by the first end effector controller 16. The vision system 40 is controlled by the first robot controller 14.

In this embodiment, measurements of the distance moved by the pressure foot 30 in relation to the first frame 26, as taken by the sensor 32, may be sent to first end effector controller 16. Also, measurements of the light passing through the passage 44, as taken by the camera 42 of the vision system 40, may be sent to first robot controller 14.

Figure 4:
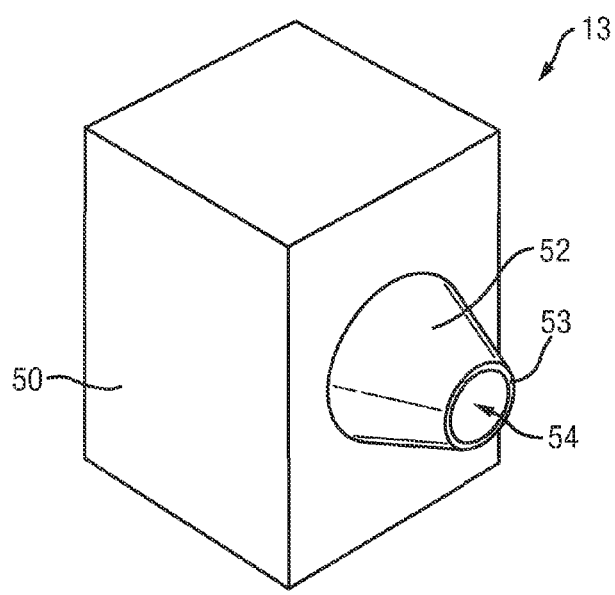
FIG. 4 is a schematic illustration (not to scale) of a second end effector.

FIG. 4 is a schematic illustration (not to scale) of the second end effector 13.

In this embodiment, the second end effector 13 comprises a second frame 50, a nose piece 52 and a lighting system 54.

The second frame 50 of the second end effector 13 is attached to the second robot 12.

The nose piece 52 is attached to a front of the second frame 50. The nose piece 52 has the shape of a frustum of a cone with a hole 53 through its structure along its longitudinal axis. Swarf extraction by the second swarf extraction system 24 may be performed through the hole 53 in the nose piece 52.

The lighting system 54 is a conventional lighting system that is configured to, under instruction from the second end effector controller 20, shine a light out of the second end effector 13 through the hole 53 in the nose piece 52. In this way, in operation, light is shone from the lighting system 54 onto the rear surface of the panel 2 (i.e. the panel 2 is back-lit). The light emitted from the lighting system 54 is detectable by the camera 42 of the vision system on the first end effector 11. The light may be, for example, visible light, infrared light, or ultraviolet light.

In this embodiment, the emitting of light by the lighting system 54 is controlled by the second end effector controller 20.

Figure 5:
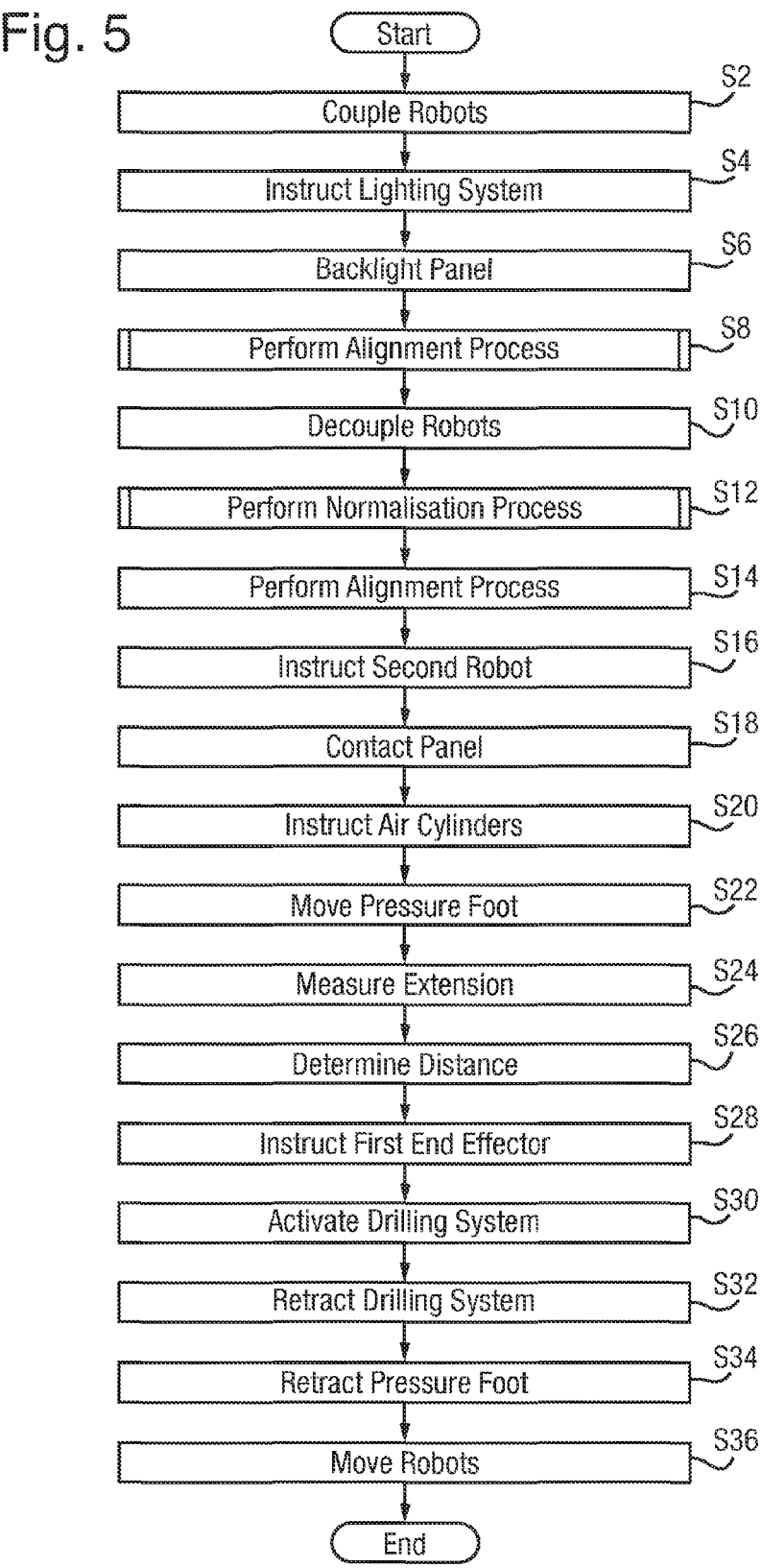
FIG. 5 is a process flow chart showing certain steps of an embodiment of a countersinking process.

FIG. 5 is a process flow chart showing certain steps of an embodiment of a countersinking process.

At step s2, the first robot 10 and the second robot 12 are linked (or coupled) together. This is done so that if the first robot 10 moves to a new position from its previous position, the second robot 12 moves such that the position of the second robot 12 with respect to the first robot 10 is maintained (i.e. such that the positions of the robots 10, 12 relative to each other are kept substantially the same), and vice versa.

In this embodiment, the first robot 10 moves to an off-line programmed position corresponding to the hole 4. This position is defined in a program running on first robot controller 14. The second robot 12 moves such that the relative position between the robots 10, 12 is maintained.

At step s4, the second end effector controller 20 instructs the lighting system 54 to shine light on to the rear surface of the panel 2.

At step s6, the lighting system 54 shines light on to the rear surface of the panel 2. The light passes through the hole 4 in the panel 2 from the rear side of the panel to the front side of the panel 2.

At step s8, an alignment process is performed.

This alignment process is described in more detail later below with reference to FIG. 6.

This alignment process is performed so as to align the cutting tool 38 of the drilling system 36 with the hole 4 in the panel 2 (such that the axis 46 is aligned with both the passage 44 and the hole 4).

At step s10, the first robot 10 and the second robot 12 are unlinked (or de-coupled) from each other. In other words, after step s10, the robots 10, 12 may move independently from one another.

At step s12, a normalisation process is performed.

This normalisation process is described in more detail later below with reference to FIG. 7.

This normalisation process is performed so as to move the drilling system such that the axis 46 of the cutting tool 38 is normal (i.e. perpendicular) to the front surface of the panel (at the point on the front surface of the panel to be drilled, i.e. at the hole 4).

At step s14, the alignment process of step s8 (as described in more detail later below with reference to FIG. 6) may be re-performed. This may be done so that, if during the normalisation process of step s12, the cutting tool 38 comes out of alignment with the hole 4, it is realigned.

At step s16, the second robot controller 18 instructs the second robot 12 to move such that the distal end of the nose piece 52 contacts (i.e. presses against) the rear surface of the panel 2.

At step s18, the second robot 12 moves the second end effector 13 towards the rear surface of the panel 2 until the nose piece 52 contacts the rear surface of the panel 2.

In this embodiment, the distance between the nose piece 52 and the rear surface of the panel 2 is a known distance. Thus, the second robot 12 moves the second end effector 13 forward towards the rear surface of the panel 2 by this known distance. Movement of the second robot 12 is stopped once the nose piece 52 comes into contact with the rear surface of the panel 2.

In this embodiment, the contact between the nose piece 52 and the rear surface of the panel 2 is such that the hole 53 through the nose piece 52 surrounds the hole 4 on the rear surface of the panel 2. In other words, after step s18, the nose piece 52 is in contact with the rear surface of the panel 2, and the hole 53 through the nose piece 52 is aligned with the hole 4 through the panel 2.

At step s20, the first end effector controller 16 instructs the air cylinders 28 to extend the pressure foot 30 from the first frame 26 until the pressure foot 30 contacts the front surface of the panel 2.

At step s22, the air cylinders 28 move the pressure foot 30 with respect to the first frame 26 until the pressure foot 30 contacts the front surface of the panel 2 (e.g. with the normalisation system 31). Extension of the pressure foot 30 from the first frame 26 is stopped once the pressure foot 30 comes into contact with the front surface of the panel 2. Such movement of the pressure foot 30 advantageously causes the panel to be clamped between the nose piece 52 of the second end effector 13 and the pressure foot 30 of the first end effector 11. In other words, the panel 2 is clamped between the end effectors 11, 13 at a position that is local to the hole 4 (i.e. the clamping force is applied to the panel 2 near the hole 4). This clamping of the panel 2 is relatively secure, i.e. so that movement (e.g. deflection or bending) of at least the portion of the panel 2 that is at or proximate (i.e. near) to the hole 4 is opposed. In other words, the portion of the panel 2 that is local to the hole 4 is relatively immovable, e.g. by the action of drilling/countersinking.

At step s24, a measurement of how far the pressure foot 30 is extended from the first frame 26 at step s22 is taken by the sensor 32 and sent from the first end effector 11 to the first end effector controller 16.

At step s26, the first end effector controller 16 determines how far the cutting tool 38 is to be moved along its axis 46 in order to drill, along the axis of the hole 4 with which it is aligned, to the desired pre-determined depth.

In this embodiment, this distance to be moved by the cutting tool 38 along its axis 46 is determined using (e.g. by adding together): (i) the distance between the tip of the cutting tool 38 and the front of the pressure foot 30 when the pressure foot has not been extended from the first frame 26; (ii) the measurement by the sensor 32 of how far the pressure foot 30 has been moved; and (iii) the pre-determined depth. The distance between the tip of the cutting tool 38 and the front of the pressure foot 30 (when the pressure foot 30 has not been extended from the first frame 26) is a known distance (along the axis 46 of the cutting tool 38).

At step s28, the first end effector controller 16 instructs the first end effector 11 to activate the cutting tool 38 (using the spindle) and move the cutting tool 38 along its longitudinal movement axis 46 by the distance determined at step s26.

At step s30, the first end effector 11 moves the drilling system 36 in accordance with the received instruction, i.e. so that the cutting tool 38 is activated and moved along its axis 46 by the determined amount so as to drill into the panel 2 along the length of the hole 4 to the pre-determined depth, i.e. to countersink the hole 4.

In this embodiment, during the drilling/countersinking process, the swarf extraction systems 22, 24 are activated so as to extract swarf.

At step s32, when the cutting tool 38 has been moved so as to countersink the hole 4 to the pre-determined depth, and the cutting tool has dwelled for a pre-determined amount of time, the drilling system 36 is retracted from the panel 2 (under control of the first end effector controller 16).

The swarf extraction systems 22, 24 are deactivated once the cutting tool 38 has been retracted from the panel 2.

At step s34, under control of the first end effector controller 16, the pressure foot 30 is retracted back to its starting position relative to the first frame 26. Also, under control of the first end effector controller 16, the rotatable leg 34 is rotated such that the camera is realigned with the passage 44.

At step s36, under control of their respective robot controllers 14, 18, the first and second robots 10, 12 are moved back to their starting positions.

Thus, a countersinking process is provided. This process may be repeated for any number of holes drilled through the panel 2.

Figure 6:
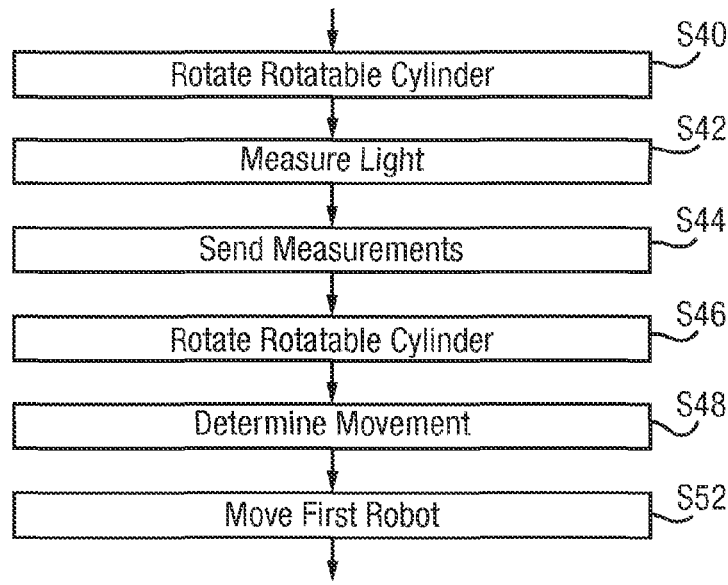
FIG. 6 is a process flow chart showing certain steps of the alignment process.

FIG. 6 is a process flow chart showing certain steps of the alignment process performed at step s8 of the process of FIG. 5. In this process, certain of the steps may be performed continuously and certain of the steps may be iterated until the cutting tool of the drilling system 22 is aligned with the hole 4 in the panel 2.

At step s40, under the action of the first end effector controller 16, the rotatable leg 34 is rotated such that the camera 42 of the vision system 40 is aligned with the passage 44 through the pressure foot 30.

At step s42, using the camera 42, the vision system 40 measures the light shining through the hole 4 (from the rear of the panel 2 to the front of the panel 2) from the lighting system 54 of the second end effector 13.

At step s44, the measurements made of the light by the camera 42 of the vision system 40 are sent to the first robot controller 14.

At step s46, under the action of the first end effector controller 16, the rotatable leg 34 is rotated such that the axis 46 of the cutting tool 38 is aligned with the passage 44 through the pressure foot 30.

At step s48, depending on the measurements of the light, the first robot controller 14 determines how the first robot 10 should be moved in order to align the axis 46 of the cutting tool 38 (which is now aligned with the passage 44) with that of the hole 4. Known values of parameters such as the relative positions of the camera 42 and the cutting tool 38, light properties (intensity etc.), properties of the hole 4 (size etc.) may be used to determine this desired movement for the first end effector 11. In other words, at step s48, the measurements/images captured at step s42 are analysed by the first robot controller 14 to determine the position of the centre of the hole 4. The first robot controller 14 then calculates the position that the first robot 10 should move the first end effector 11 to, so that the axis 46 of the cutting tool 38 is aligned with the centre of the hole 4.

At step s52 the first robot controller 14 moves the first robot 10 according to the determined information (i.e. such that the first end effector 11 is moved so that the axis 46 of the cutting tool 38 is aligned with that of the hole 4 in the panel 2).

Thus, an alignment process by which the axis 46 of the cutting tool 38 is aligned with that of the hole 4 in the panel 2 is provided.

Figure 7:
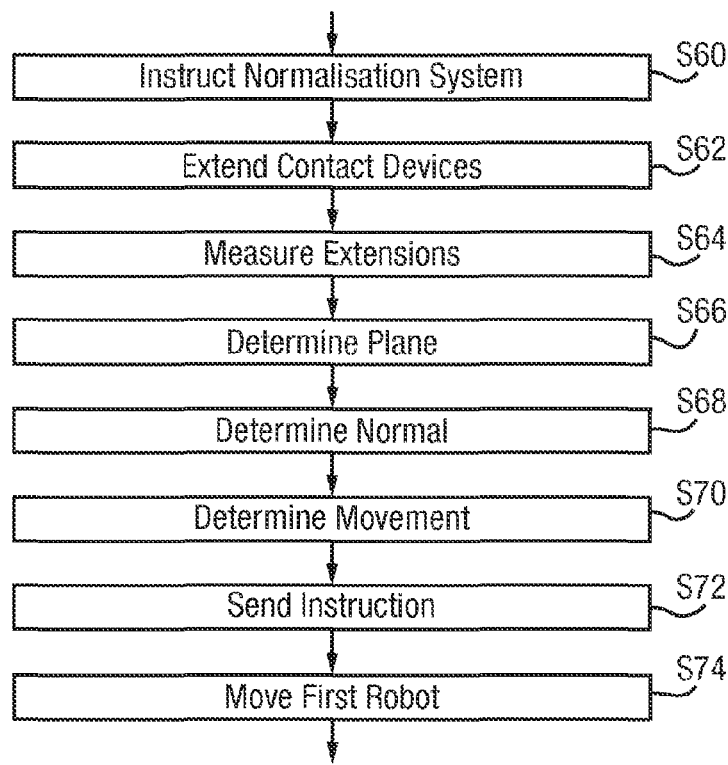
FIG. 7 is a process flow chart showing certain steps of a normalisation process.

FIG. 7 is a process flow chart showing certain steps of the normalisation process performed at step s12 of the process of FIG. 5.

At step s60, the first end effector controller 16 instructs normalisation system 31 to extend each of its contact measurement devices until each contact measurement device contacts the front surface of the panel 2.

At step s62, each of the contact measurement devices of the normalisation system 31 are extended from the front surface of the pressure foot 30 until each contact measurement device contacts the front surface of the panel 2. Extension of a contact measurement device is stopped once it comes into contact with the front surface of the panel 2. This stopping of the extension of the extendible members may be as a result of the resistive force applied to the extendible member, by the panel 2, when the extendible member contacts the front surface of the panel 2. In other words, the front surface of the panel 2 may prevent further extension of the extendible members.

Figure 8:
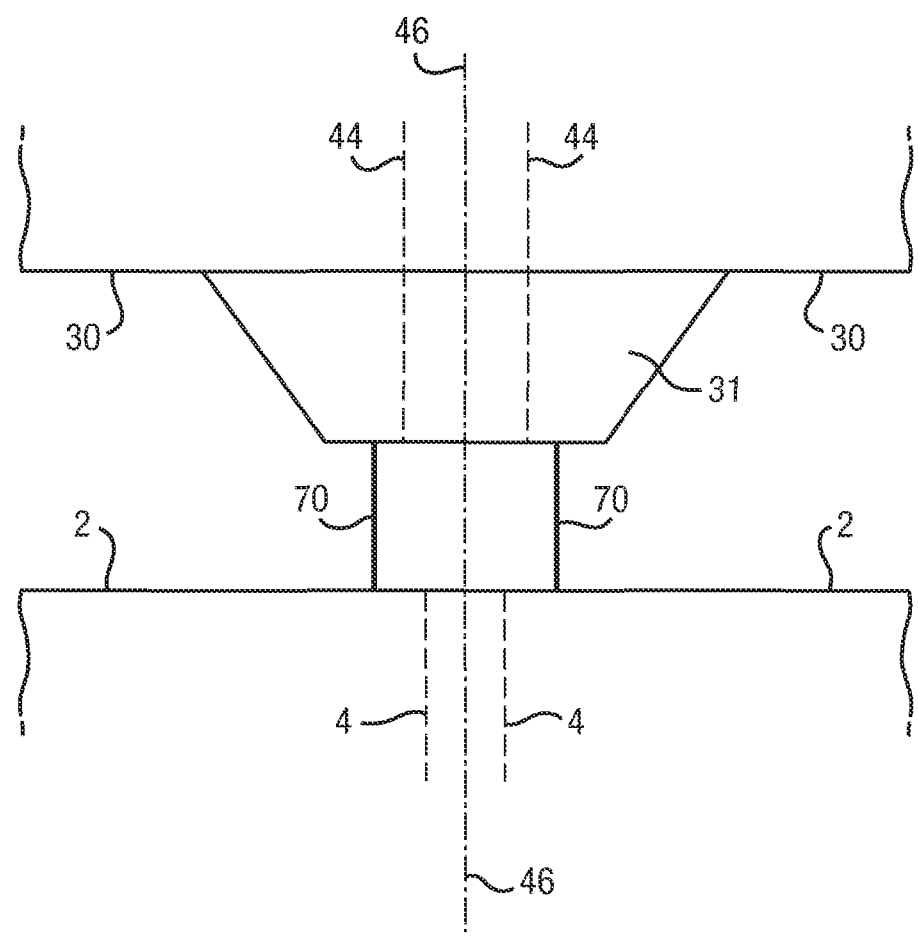
FIG. 8 is a schematic illustration (not to scale) showing a side view of a normalisation system in use.

FIG. 8 is a schematic illustration (not to scale) showing a side view of contact measurement devices 70 of the normalisation system 31 after having been extended from the normalisation system 31 (away from the front surface of the pressure foot 30) until the contact measurement devices come into contact with the front surface of the panel 2 (proximate, i.e. local, to the hole 4).

In this embodiment, because the normalisation system 31 surrounds the passage 44, and the passage 44 has been aligned with the hole 4 in the panel 2 (by the performance of the alignment process described above with reference to FIG. 6), when the contact measurement devices are extended so as to contact the front surface of the panel 2, the points on the surface of the panel 2 that are contacted are proximate to the hole 4. In particular, in this embodiment the contact points surround the hole 4.

At step s64, a measurement of how far each of the five contact measurement devices is extended at step s62 is sent from the normalisation system 31 to the first robot controller 14.

At step s66, using the received measurements, the first robot controller 14 determines the plane of the front surface of the panel. In particular, the plane of a portion of the front surface of the panel 2 that is proximate to the hole 4 is calculated.

At step s68, using the calculated plane, the first robot controller 14 determines the normal to that plane.

At step s70, using the determined normal, the first robot controller 14 determines how the first end effector 11 should be moved in order to align the axis 46 of the cutting tool 38 with the determined normal.

At step s72, the determined movement of the first end effector 11 that would align the axis 46 of the cutting tool 38 with the determined normal to the panel is sent from the first robot controller 14 to the first robot 10.

At step s74, the first robot controller 14 moves the first robot 10 according to the received information (i.e. such that the first end effector 11 is moved so that the axis 46 of the cutting tool 38 is aligned with the determined normal to the panel 2).

Thus, an alignment process by which the axis 46 of the cutting tool 38 is aligned with a normal to the portion of the panel 2 that is local to the hole 4 is provided. This normalisation process provides that the direction of movement of the cutting tool 38 tends to be aligned with the direction of the hole 4 through the panel 2.

An advantage of the above provided countersinking process, is that the process is performed using commercially available, "off-the shelf" industrial robots. Furthermore, it tends to be possible to use the same robots to perform the countersinking/drilling process on any type of panel or part, and on any shape of panel or part. Thus, the use of relatively expensive machine tools tends to be advantageously avoided.

The robots used in the above described countersinking process may use different sized/shaped cutting tools. Thus, the robots may be used to perform many types of drilling/countersinking operations. To account for different sizes/shapes of cutting tools, a size (e.g. a length) of a cutting tool may be measured accurately on a Kelch pre-setter. This data, along with other data e.g. like tool number, tool life etc., may be stored on a Radio Frequency Identification (RFID) chip attached to the chuck. When a tool is selected from a tool changer, the data stored on the RFID chip may be read by a reader linked to the controlling unit. The system may then determine, for example, which tool it is using, how many holes it can drill before the tool must be changed, and the length of the tool. The tool length may be used in the determination of how far along its axis the cutting tool should be moved in order to drill into a panel/part to a desired pre-determined depth. Tool life may advantageously be monitored by decrementing the available life of a tool each time a hole is countersunk with that tool, and storing the decremented tool life on the RFID chip for that tool.

A further advantage of the above provided countersinking process, is that the process is performed using a commercially available, "off-the shelf" fixture. Furthermore, it tends to be possible to use the same fixture in the performance of the countersinking/drilling process on any type of panel or part, and on any shape of panel or part. The fixture used in the above described process is only used to hold the part relatively loosely, whereas the bespoke fixtures used conventionally are required to hold a part securely so that it does not bend or deflect during drilling. The fixture does not need to be bespoke to the part being drilled. Thus, the use of relatively expensive bespoke fixtures tends to be advantageously avoided.

Further advantages tend to be provided by the nose piece of the second end effector that has the shape of the frustum of a cone with a hole through its structure along its axis. The hole through the nose piece is large enough to advantageously let enough light through for detection by the camera of the vision system. The hole through the nose piece is small enough to allow for efficient swarf extraction by the second swarf extraction system through the hole in the nose piece. The tapering of the nose piece is such that the front of the nose piece can be placed in contact with the rear surface of the panel, even if that surface is curved. The diameter of the front of the nose piece, and the diameter of the hole, are advantageously sized so as to provide a good support to the panel during countersinking, and prevent or oppose deformation and/or slippage of the panel in at least a portion of the panel that is proximate to the hole.

During drilling, the second robot advantageously tends to be in contact with the rear surface of the panel/part being drilled. This tends to provide that the second robot applied to the panel an equal and opposite force to that applied during drilling by the first robot. In other words, the panel is secured (so that at least the portion of the panel proximate to the point being drilled tends not to bend or deflect during the drilling operation) by the actions of the first and second robots. The second robot may comprise a small proximity switch or load cell for detecting when the second robot contacts the rear surface of the panel/part as it advances up to it.

In the above embodiments, the countersinking process was performed on a flat panel. However in other embodiments, the countersinking process may be performed on a non-flat panel.

What will now be described is an embodiment of a method of performing a countersinking process on a curved panel.

Figure 9:
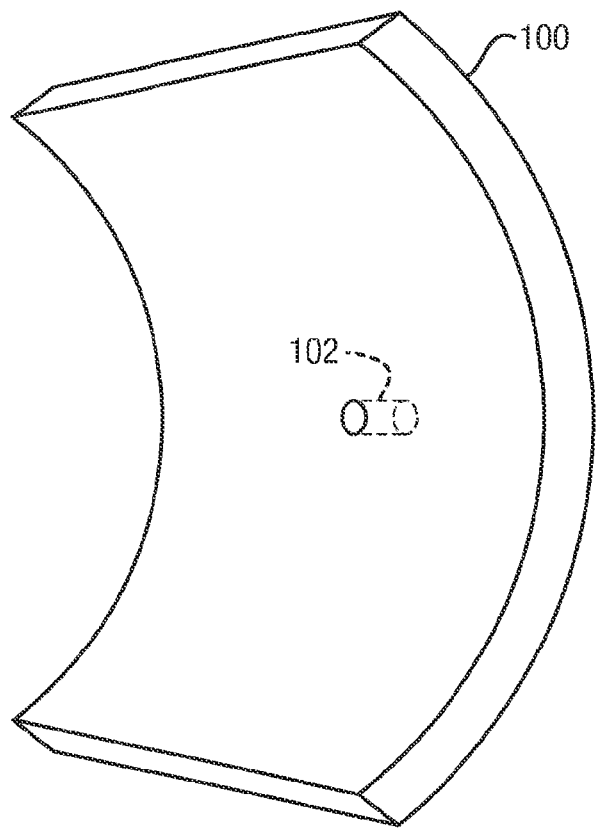
FIG. 9 is a schematic illustration (not to scale) of a curved panel.

FIG. 9 is a schematic illustration (not to scale) of the curved panel 100. The curved panel 100 is the same type of panel as the panel 2 described above with reference to FIG. 1. Similar to the panel 2, the curved panel 100 comprises a further hole 102 through it, from a front surface of the curved panel 100 to a rear surface of the curved panel 100. The front surface of the curved panel 100 is a concave surface. The rear surface of the curved panel 100 is a convex surface.

The further hole 102 is of known diameter, and the direction of the further hole 102 through the curved panel 100 is normal (i.e. perpendicular) to a tangent to a surface of curved panel 100 at that point.

Figure 10:
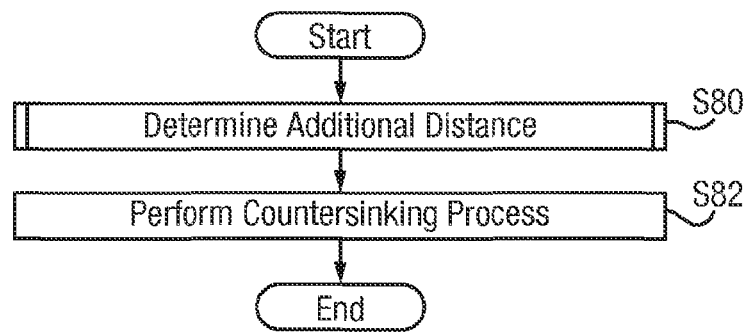
FIG. 10 is a process flow chart showing certain steps of a method of performing a countersinking process on the curved panel.

FIG. 10 is a process flow chart showing certain steps of a method of countersinking the further hole 102 of the curved panel 100.

At step s80, a process for determining an additional distance, due to the curvature of the curved panel 100, that the cutting tool is to be moved through in order to countersink the further hole 102 to the desired depth is performed. This process will be described in more detail later below with reference to FIG. 11.

At step s82, a countersinking process is performed. In this embodiment, the countersinking process performed at step s62 comprises performing each of the steps s2 to s36 as described above with reference to FIGS. 5 to 8 (with the panel 2 replaced by the curved panel 100, and the hole 4 replaced by the further hole 102). However, the step of the first end effector controller 16 determining how far the cutting tool 38 is to be moved in order to countersink the further hole 102 to the pre-determined depth (i.e. step s26 of the countersinking process) uses the additional distance determined at step s80.

In particular, in this second embodiment, at step s26, the first end effector controller 16 determines how far the cutting tool 38 is to be moved along its axis 46 in order to drill, along the axis of the further hole 102 with which it is aligned, to the pre-determined depth. In this second embodiment, this distance to be moved by the cutting tool 38 along its axis 46 is determined using (e.g. by adding together): (i) the distance between the tip of the cutting tool 38 and the front of the pressure foot 30 when the pressure foot has not been extended from the first frame 26; (ii) the measurement by the sensor 32 of how far the pressure foot 30 has been moved; (iii) the pre-determined depth; and (iv) the additional distance determined at step s80.

Thus, a method of performing a countersinking process on the curved panel 100 is provided.

FIG. 11 is a process flow chart showing certain steps of a process of for determining the additional distance, due to the curvature of the curved panel 104, that the cutting tool 38 is to be moved through in order to countersink the further hole 102 to the pre-determined depth (as performed at step s80 of the process of FIG. 10).

At step s84, a Computer Aided Design (CAD) model of the curved panel 100 is created. The CAD model of the curved panel 100, hereinafter referred to as the "first CAD model", may be drawn using any conventional CAD software package.

At step s86, a Computer Aided Design (CAD) model of the pressure foot 30 is created. The CAD model of the pressure foot 30, hereinafter referred to as the "second CAD model", may be drawn using any conventional CAD software package. The second CAD model may also model the normalisation system 31.

At step s88, the first and second CAD models are used to model how the pressure foot 30 and the curved panel 100 would contact each other if the pressure foot 30 was extended from the first frame 26 until it contacted the front (convex) surface of the curved panel 100. This modelled contact is described in more detail later below with reference to FIG. 12.

At step s90, using the model of the contacting pressure foot 30 and curved panel 100, the additional distance, due to the curvature of the curved panel 100, that the cutting tool 38 is to be moved through in order to countersink the further hole 102 to the pre-determined depth is determined. This determination of the additional distance is described in more detail later below with reference to FIG. 12.

FIG. 12 is a schematic illustration (not to scale) showing the first CAD model 104 (i.e. the CAD model of the curved panel 100) and the second CAD model 106 (i.e. the CAD model of the pressure foot 30).

The first CAD model 104 comprises a model of the further hole 102. The model of the further hole 102 has, for convenience and ease of understanding, been indicated in FIG. 12 by the same reference numeral as the further hole 102 (i.e. the reference numeral 102).

The second CAD model 106 comprises a model of the passage 44 in the pressure foot 30 through which the cutting tool 38 is passed during a drilling/countersinking operation. The model of the passage 44 has, for convenience and ease of understanding, been indicated in FIG. 12 by the same reference numeral as the passage 44 (i.e. the reference numeral 44). The second CAD model 106 may also model the normalisation system 31 (not shown in FIG. 12 for reasons of clarity).

The convex surface 108 of the first model 104 is in contact with the front surface 110 of the second model 106.

An axis 112 is also shown in FIG. 12. The axis of the further hole 102 and the axis of the passage 44 are aligned along the axis 112.

Thus, the relative positions of the CAD models 104, 106 shown in FIG. 12 are substantially the same as the actual positions that the curved panel 100 and the pressure foot 30 would have if: (i) the axis of the further hole 102 and the axis of the passage 44 were aligned with one another; and (ii) if the pressure foot 30 had been extended from the first frame 26 until it contacted the front (convex) surface of the curved panel 100.

In this embodiment, the modelled contact between the curved panel 100 and the pressure foot 30 (as shown in FIG. 12) is used to determine the distance indicated in FIG. 12 by a double headed arrow and the reference sign d. This additional distance d is the additional distance, due to the curvature of the curved panel 100, that the cutting tool 38 is to be moved through (along the axis 46) in order to countersink the further hole 102 to the pre-determined depth.

If the first model 104 was of a flat panel (e.g. the panel 2 from the first embodiment), the whole of the front surface 110 of the second model 106 would be in contact with the flat front surface 108 of the first model 104. Thus, the value of the distance d would be zero. However, in this embodiment the panel is curved and so the distance d is non-zero. The cutting tool 38 also has to be moved through the additional distance d (in addition to that distance it would have to be moved through if the panel was flat). The additional distance d may be measured directly from the models 104, 106.

Thus, a process of determining an additional distance that the cutting tool 38 is to be moved through is provided.

In addition to the advantages mentioned above for the first embodiment, modelling of the panel/part to drilled, and the pressure foot advantageously tends to provide that any additional distance required to be moved by the cutting tool to drill to a desired depth may be determined.

Thus, the above described system and method tend to provide that drilling/countersinking to a pre-determined depth into a curved (or non-flat) surface is possible.

Apparatus, including the controllers 14, 16, 18, 20, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 5 to 7, 9 and 10, and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the countersinking process is performed on a (flat or non-flat) panel. The panel is made of carbon fibre and is for fixing to a structure to form an airframe. However, in other embodiments, the countersinking process is performed on a different type of part, e.g. a part made of one or more different types of material, or a part for a different purpose.

In the above embodiments, the process performed on the panel/part is a countersinking process (for countersinking a predrilled hole). However, in other embodiments, the process performed is a different type of drilling/cutting process, e.g. a process of drilling holes in a part/panel, which e.g. may be countersunk later.

In the above embodiments, the normalisation system comprises five contact measurement devices, each of which extends to contact the front surface of the panel. Measurements from these five devices are used to calculate the normal to the surface with which to align the cutting tool. However, in other embodiments, the normalisation system comprises a different number of contact measurement devices (e.g. three or four). The use of five contact measurement devices tends to advantageously provide a greater degree of redundancy than three or four. In other embodiments, measurements of the distance between the first robot and the panel may be taken using a different type of system, e.g. a laser range sensor.

In the above embodiments, the contact between a panel/part and the pressure foot is modelled using CAD models of the panel/part and the pressure foot. However, in other embodiments, the contact between the part/panel and the pressure foot may be determined in a different way, e.g. using one or more different types of models of the part/panel and/or pressure foot.

The invention claimed is:

1. A method of countersinking a hole formed in a curved aircraft panel using a drilling apparatus, the drilling apparatus comprising a pressure foot and a cutting tool, the pressure foot being for contacting with a surface of the aircraft panel during a countersinking process, the pressure foot comprising a passage through which the cutting tool is to be passed during the countersinking process, the method comprising:

providing a first digital model, the first digital model being a model of the aircraft panel including a model of the hole;

providing a second digital model, the second digital model being a model of at least part of the pressure foot including a model of the passage;

arranging the first model and the second model such that a curved surface of the first model is in contact with a front surface of the second model, and such that an axis of the model of the hole is aligned with an axis of the model of the passage;

using said arrangement of the first model and the second model, determining a first distance, the first distance being a distance between an opening of the model of the passage at the front surface of the second model and an opening of the model of the hole at the curved surface of the first model, the distance being in a direction substantially parallel to the aligned axes;

determining a second distance, the second distance being a sum of: a distance between a tip of the cutting tool and the front surface of the pressure foot, the determined first distance, and a predetermined depth to which the hole is to be countersunk; and performing the countersinking process including moving the pressure foot such that a front surface of the pressure foot is in contact with a curved surface of the aircraft panel, and such that an axis of the hole is aligned with an axis of the passage, and moving the cutting tool through the passage so as to countersink the hole, wherein a distance through which the cutting tool is moved is equal to the determined second distance.

2. The method according to claim 1, the method further comprising:

pressing a member against an opposite side of the aircraft panel to the side of the aircraft panel in contact with the pressure foot so as to hold the aircraft panel and prevent deflection of at least a portion of the aircraft panel; wherein the step of countersinking is performed when the part is held by the pressure foot and the member.

3. The method according to claim 1, wherein the hole is a predrilled hole through the aircraft panel from one side of the panel to the opposite side.

4. The method according to claim 3, the method further comprising:

shining light through the predrilled hole;

measuring the light after it has been shone through the predrilled hole;

using the measurements of the light, aligning the cutting tool with the predrilled hole.

5. The method according to claim 4, wherein:

the light is detected by a light detection system coupled to a first robot;

the light is shone by a lighting system coupled to a second robot;

the light detection system is coupled to the cutting tool; and aligning the cutting tool with the predrilled hole comprises using known relative positions of the drilling tool and the light detection system.

6. The method according to claim 1, the method further comprising:

measuring at least part of a surface of the aircraft panel;

using the measurements of the surface, moving the cutting tool to be normal to the measured surface of the aircraft panel.

7. The method according to claim 6, wherein the step of measuring at least part of a surface of the aircraft panel comprises measuring the surface at a plurality of points on the surface of the aircraft panel that are proximate to the hole.

8. The method according to claim 6, wherein the measured surface of the aircraft panel is the curved surface of the aircraft panel.

9. The method according to claim 1, wherein:

the pressure foot is moveable with respect to the cutting tool;

the moving of the pressure foot into contact with the curved surface of the aircraft panel comprises moving the pressure foot by a certain distance with respect to the cutting tool; and the method further comprises measuring the certain distance moved by the pressure foot with respect to the cutting tool; and the step of determining the second distance comprises using the measurement of the certain distance moved by the pressure foot with respect to the cutting tool.

10. The method according to claim 1, the method further comprising extracting swarf during the step of countersinking.

11. The method according to claim 1, wherein the curved surface of the aircraft panel is a concave surface.

12. An aircraft panel comprising:

a predrilled hole formed in the aircraft panel, the predrilled hole being from a first side of the panel to a second side of the panel, the first side being opposite to the second side, the first side of the panel being a curved surface; and a countersink formed through at least a portion of the predrilled hole to a predetermined depth, the countersink being formed at the first, concave, side of the panel;

wherein the countersink has been formed in accordance with a method for countersinking the predrilled hole according to claim 1.

13. An apparatus for countersinking a hole formed in a curved aircraft panel, the apparatus comprising:

a drilling apparatus comprising a first member comprising a pressure foot and a cutting tool coupled to a first robot, the pressure foot being for contacting with a surface of the aircraft panel during a countersinking process, the pressure foot comprising a passage through which the cutting tool is to be passed during the countersinking process;

a second member coupled to a second robot;

one or more processors comprising:

a first digital model, the first digital model being a model of the aircraft panel including a model of the hole;

a second digital model, the second digital model being a model of at least part of the pressure foot including a model of the passage; wherein the one or more processors are configured to:

arrange the first model and the second model such that a curved surface of the first model is in contact with a front surface of the second model, and such that an axis of the model of the hole is aligned with an axis of the model of the passage;

using said arrangement of the first model and the second model, determine a first distance, the first distance being a distance between an opening of the model of the passage at the front surface of the second model and an opening of the model of the hole at the curved surface of the first model, the distance being in a direction substantially parallel to the aligned axes; and determine a second distance, the second distance being a sum of:

a distance between a tip of the cutting tool and the front surface of the pressure foot, the determined first distance, and a predetermined depth to which the hole is to be countersunk; and a controller configured to control the drilling apparatus to perform the countersinking process including moving the pressure foot such that a front surface of the pressure foot is in contact with a curved surface of the aircraft panel, and such that an axis of the hole is aligned with an axis of the passage, and moving the cutting tool through the passage so as to countersink the hole, wherein a distance through which the cutting tool is moved is equal to the determined second distance;

wherein the apparatus is arranged to press the members against opposite sides of the curved aircraft panel to be drilled so as to hold the curved aircraft panel and prevent deflection of at least a portion of the curved aircraft panel the drilling being from the side of the curved aircraft panel pressed against by the first member.

14. The apparatus according to claim 13, wherein the curved surface of the aircraft panel is a concave surface.

15. A non-transitory computer-readable medium having stored thereon instructions that, when executed by a computing device, cause the computing device to perform operations in accordance with the method of claim 1.

* * * * *